(12) United States Patent
Wang

(10) Patent No.: US 6,330,078 B1
(45) Date of Patent: Dec. 11, 2001

(54) FEEDBACK METHOD AND APPARATUS FOR PRINTING CALIBRATION

(75) Inventor: Shen-Ge Wang, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/208,304

(22) Filed: Dec. 9, 1998

(51) Int. Cl.[7] ...................................................... G06F 15/00
(52) U.S. Cl. ............................................ 358/1.9; 358/501
(58) Field of Search .................................... 358/500, 504, 358/501, 530; 382/162, 167; 395/1.9

(56) References Cited

U.S. PATENT DOCUMENTS

| | | |
|---|---|---|
| 3,590,142 * | 6/1971 | Keller ....................................... 178/5.2 |
| 4,679,072 * | 7/1987 | Takayama ................................ 358/80 |
| 5,241,373 * | 8/1993 | Kanamori ................................ 358/27 |
| 5,305,119 | 4/1994 | Rolleston et al. . |
| 5,307,182 | 4/1994 | Maltz . |
| 5,416,613 | 5/1995 | Rolleston et al. . |
| 5,471,324 | 11/1995 | Rolleston . |
| 5,483,360 | 1/1996 | Rolleston et al. . |
| 5,528,386 | 6/1996 | Rolleston et al. . |
| 5,581,376 | 12/1996 | Harrington . |
| 5,592,591 | 1/1997 | Rolleston . |
| 5,594,557 | 1/1997 | Rolleston et al. . |
| 5,649,072 | 7/1997 | Balasubramanian . |
| 5,689,350 | 11/1997 | Rolleston . |
| 5,696,611 * | 12/1997 | Nishimura et al. ................... 358/518 |
| 5,734,802 | 3/1998 | Maltz et al. . |
| 5,739,927 | 4/1998 | Balasubramanian et al. . |
| 5,787,193 | 7/1998 | Balasubramanian . |
| 5,802,214 | 9/1998 | Eschbach et al. . |
| 6,222,648 * | 4/2001 | Wolf et al. ............................ 358/504 |

\* cited by examiner

*Primary Examiner*—Jerome Grant, II
(74) *Attorney, Agent, or Firm*—Fay, Sharpe, Fagan, Minnich & McKee, LLP

(57) ABSTRACT

A method and apparatus for calibrating a color printer for improved color matching between an original input document and a color printed representation thereof Such a transformation involves a converting of data signals between color spaces wherein the original color space is usually a device-independent color space (CIE XYZ or Lab) and the output color space is device dependent to the printer (CMYK). The invention comprises transforming a first signal representative of an original document to a first intermediate signal in the device dependent color space where the transforming occurs by an inverse form of the transform. The first intermediate printer signal is then transformed back to the original color space by a forward transform of the transform. A difference between the second device-independent color space signal and the original color space signal is identified and is utilized as a feedback signal to adjust the original color signal by the difference for the generation of an adjusted original color space signal. The adjusted original color space signal is transformed by the inverse form of the transform to a printer signal for printing an improved and calibrated output from the printer.

9 Claims, 1 Drawing Sheet

FEEDBACK METHOD AND APPARATUS FOR PRINTING CALIBRATION

The present invention relates to the processing of image data in a digital color printing or reproduction system. More specifically, the present invention relates to the calibrating of a signal transformation between respective color spaces by including a feedback step in the calibration algorithm for adjusting colorimetric data signals and to provide improved overall accuracy in the print output.

BACKGROUND OF THE INVENTION

The use of color in the digital environment presents continual problems with regard to accuracy and matching of colors that are intended to appear the same when presented through different devices or on different mediums. Specifically, it is hoped that a color can be perceived as the same even though viewed on a photograph and then scanned into the digital environment, displayed on a CRT monitor or printed on a color printer. Since each of these elements involve a different form of color definition in a distinct color space, the transformation of color through the different color spaces while maintaining a perceptually accurate matching, is a difficult problem to solve. More particularly, how a color appears on a color photograph is typically defined by one form of colorimetric data, i.e., a device independent color space, such as CIE XYZ or CIE Lab (for general background discussion of different color spaces see Billmeyer and Saltzman, *Principles of Color Technology*, 2nd Ed., Wiley and Sons, 1981; Russ, *The Image Processing Handbook*. 2nd Ed., CRC Press, 1995 ). The data signals for colors for a printer are defined in a device dependent color space, such as CMY or CMYK. Most calibration of a transformation between a device dependent color space and a device independent color space occurs through a lookup table (LUT) comprised of a limited number of predetermined matches between a standard target and the device output. For example, a common industry target is a Kodak Q60 target comprised of 264 different color patches which can be used to calibrate a device such as a printer for those limited 264 colors. For the literally millions of colors that could be printed by a printer in addition to the exemplary 264 patches from the target, some form of interpolation about the predetermined values is employed.

For detailed discussions of color printing and calibrating systems, the following commonly-assigned patents should be referenced:

| | |
|---|---|
| U.S. Pat. No. 5,787,193 | U.S. Pat. No. 5,528,386 |
| U.S. Pat. No. 5,739,927 | U.S. Pat. No. 5,483,360 |
| U.S. Pat. No. 5,689,350 | U.S. Pat. No. 5,471,324 |
| U.S. Pat. No. 5,649,072 | U.S. Pat. No. 5,416,613 |
| U.S. Pat. No. 5,594,557 | U.S. Pat. No. 5,307,182 |
| U.S. Pat. No. 5,592,591 | U.S. Pat. No. 5,305,119 |
| U.S. Pat. No. 5,581,376 | |

All of which patents are herein incorporated by reference.

There are many ways to implement a calibrated lookup table in a digital signal processing system. The present invention is applicable to any method implemented either by software-based or hardware-based algorithms. A demonstration of a particular application, which is described later for the present invention, is a software implemented algorithm for effecting the lookup table by a three-layer feedforward neural network. Such neural networks are common and well known and can be referenced in Timothy Masters, *Practical Neural Networks in C++*, Academic Press, Inc. 1993.

The transformation process by which a colorimetric data signal is converted from one color space to another is conventionally referred to as a transform. For printer calibration, the transformation from a device dependent color space, i.e., CMYK, to a device independent color space, i.e., CIE Lab, is often referred to as a forward transform [T(CMYK)→Lab], while the transformation from the device independent color space to the device dependent color space is referred to an inverse transform [$T^{-1}$(Lab) →CMYK].

It is a fact of the transforming process that the forward transform, T(CMYK)→Lab, provides a more accurate color match than an inverse form of the transform, $T^{-1}$(Lab) →CMYK.

Keeping in mind that the printer calibration of the transform processing is merely a mathematical modeling, reasons for the disparity in accuracy between forward and inverse transforms can be better appreciated. First, the respective color spaces can be of different dimensions, such as when transforming from a three-dimensional space, Lab, to a four-dimensional space, CMYK. Interpolation relative to the fourth dimension for calibrating a color match presents a particular problem for accuracy. Secondly, there is no problem with the forward transform that the transformed data signal will be out-of-gamut, because the input color space is device dependent and the color gamut is defined by the limit of colors which could be generated by the corresponding printer. On the other hand, the input color space of an inverse transform is device independent and the output colors could be outside the gamut defined by the calibrated printer. Another reason for higher accuracy for the forward transform is that the mathematical modeling is evaluated in the Lab space, which is defined as a uniform color space in terms of human visual perception, and usually yields better optimization results.

The present invention takes advantage of the disparity in accuracy between the forward and inverse forms of the transform to calibrate or adjust an input color data signal during the transformation process itself to compensate for the detected inaccuracy of the inverse transform and thereby provide improved results.

BRIEF SUMMARY OF THE INVENTION

One aspect of the present invention is a method and apparatus for improved calibrating of a digital color printer. In converting a selected color from one color space, such as the CIE Lab space, to a different space, such as a printer-dependent CMYK color space, a mathematical model functions as linear or non-linear interpolation about a lookup table for the data signal transformation process. A selected color to be printed is first transformed to the printer color space and then transformed back to the original input color space to determine if there is a difference between the original color and the then transformed color in the same color space. Such a difference will almost always be detected. The difference is then used to adjust the original color data signal to a modified color signal which when it is transformed to the printer color space provides a printer color which is more accurate relative to the result without adjustment.

In accordance with another aspect of the present invention, the transforming includes a forward and inverse transform comprising mathematical models. The difference is identified between the original data item and the transformed data item, which difference can be applied as a feedback signal for adjusting the original item of color data to a data item which is transformed to a printer color that more accurately matches the original color data.

In accordance with another aspect of the present invention, the original data item comprises a device independent data signal such as Lab and the printer color signal is a device dependent color space such as CMYK space.

One benefit obtained by the present invention is improved accuracy in calibration of digital color printers.

Another benefit is a calibrating technique which relies solely upon feedback generating in the transforming of a single data item to adjust the data item to compensate for errors in the transformation process.

Another advantage of the subject invention is a calibration technique which effects a mathematical model that is easily implementable in different software or hardware calibration techniques.

Further objects and advantages of the present invention will become apparent from the following descriptions of the various embodiments and characteristics of the present invention.

BRIEF DESCRIPTION OF THE DRAWINGS

The following is a brief description of each drawing used to describe the present invention, and thus, are being presented for illustrative purpose only and should not be limitative of the scope of the present invention, wherein.

DETAILED DESCRIPTION OF THE PREFERRED EMBODIMENTS

Figure 2:
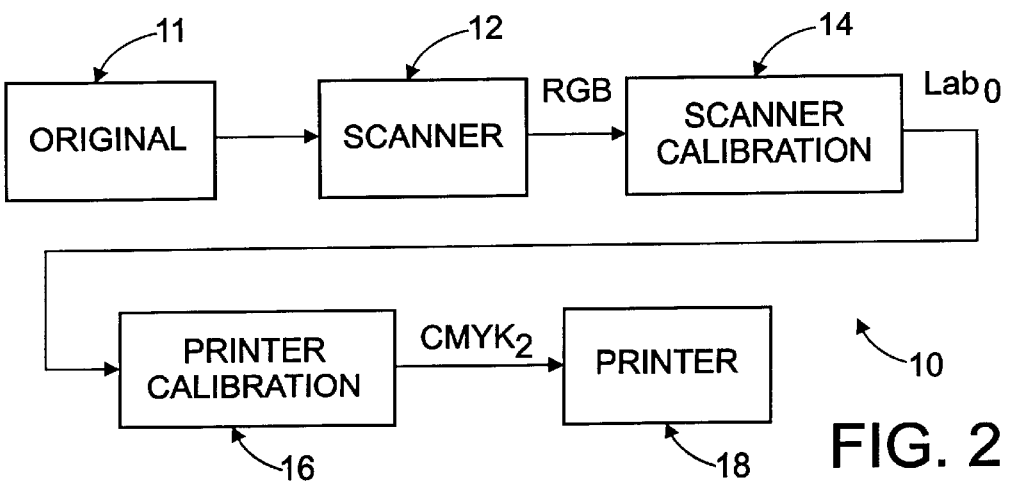
FIG. 2 illustrates a block diagram comprising a system for imaging colors in a digital printing system.

Referring now to the drawings wherein the showings are for purposes of illustrating the preferred embodiments only and not for purposes of limiting the scope of the invention, a basic system for carrying out the present invention is shown in FIG. 2. In the system 10, a scanner 12 such as a color scanner available in a color copier system from Xerox Corporation can be used to produce a set of digital data signals describing an original image 11 in a scanner-dependent RGB (red, green, blue) colorimetric color space. The device dependent RGB signals can be processed by a scanner calibration processor 14 to provide a description of the original document in digital colorimetric terms, or device-independent color space, such as CIE XYZ color space or CIE Lab space. The generation of the independent color space data values for the original image is conventional as far as the present application is concerned. It may be appreciated in more particularity with reference to several of the patents referenced in the foregoing background section of this patent.

Processor 16 transforms the independent color space image data values into a device dependent space, where printer coloring signals CMYK are used to drive the printer 18. The coloring signals represent the relative amounts of cyan (C), magenta (M), yellow (Y), and black toners (K) to be deposited over a given area in an electrophotographic printer. Of course, it is the object of the subject invention that the printed image may be evaluated in terms of an independent color space such as Lab so that is substantially identical to the Lab values of the original image scanned into this system.

Figure 1:
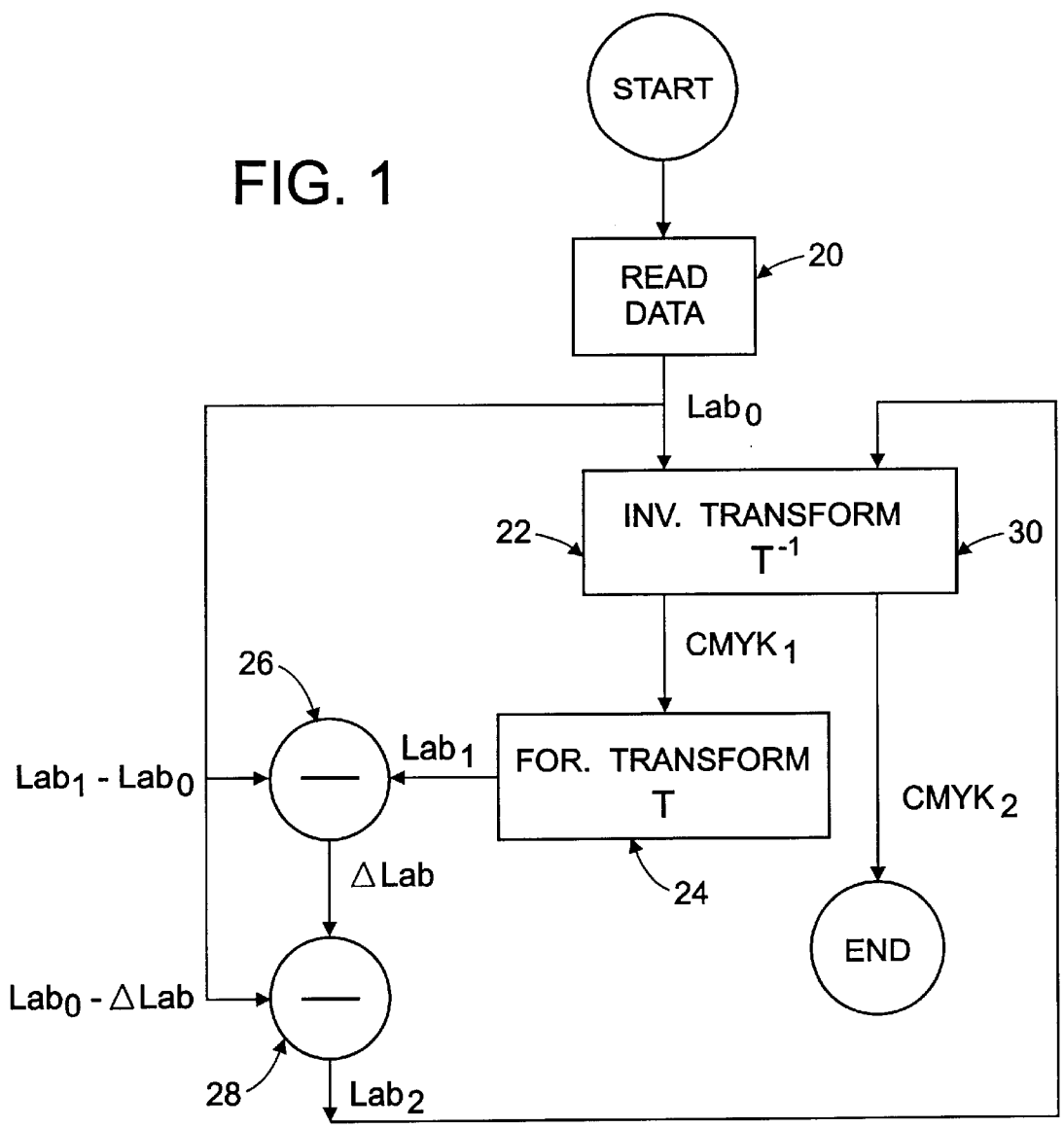
FIG. 1 is a flowchart illustrating a process for calibrating a conversion of a data item representative of a color in a first color space to a second printer color space in accordance with the present invention.

With particular reference to FIG. 1, it is a feature of the invention that the processor 16 performs a transforming of the calorimetric data including a feedback step that improves the overall accuracy of the calibration and ultimate accuracy of the printing output. The improved printer calibration depends on two transformations, the forward transformation and its inverse. The forward transform converts the CMYK data values to Lab values typically and is more accurate than the inverse transform which converts Lab values to CMYK values. The subject invention acknowledges this disparity in accuracy and employs a feedback term for correcting errors made by the inverse transformation by subtracting, from the input Lab values, an amount roughly proportional to the error made by the inverse transformation, so that in effect the original colorimetric data values are adjusted to compensate for the error made by the inverse transform in the transformation process.

In other words, the subject invention effects the system calibration by building two mathematical models converting colorimetric data between distinct color spaces. The models thus operate ultimately as two distinct lookup tables (LUTs). The same calorimetric data is calibrated by processing the data through a forward transform, $T(CMYK) \rightarrow Lab$, and another for the inverse transform, $T^{-1}(Lab) \rightarrow CMYK$. Since the accuracy of the forward transform T is higher than the inverse transform $T^{-1}$, given an original device-independent color space data value $Lab_0$, the invention comprises an estimation that the same colorimetric data value should be returned after converting the data through both the forward and inverse transforms, $CMYK_1 = T^{-1}(Lab_0)$ and $Lab_1 = T(CMYK_1)$. However, when there is a difference, $\Delta Lab$, between the transform calorimetric data $Lab_1$ and the original colorimetric data $Lab_0$, the invention estimates that the difference, $\Delta Lab$, is most likely attributable to the inverse transform $T^{-1}$. Therefore, a feedback result $CMYK_2 = T^{-1}(Lab_0 - \Delta Lab)$ provides a better estimation of the desired printer colorimetric data value.

FIG. 1 details these processing steps. The original calorimetric data of an image is read at step 20 so that the image can be defined in an independent color space of colorimetric data values identified as $Lab_0$. A color space transform is supplied to the data at step 22 and comprises an inverse form of the transform, $T^{-1}$, to convert $Lab_0$ values into a device-dependent color space for the printer, $CMYK_1$. The value $CMYK_1$, comprises a first intermediate signal of the device-dependent color space. The intermediate signal, $CMYK_1$, is then transformed back to the device-independent color space by the forward version of the transform T 24 to generate a second calorimetric data value in the independent color space, $Lab_1$. The difference between the first and second independent color space data values, $\Delta Lab$, is determined 26 and subtracted 28 from the original colorimetric data value, $Lab_0$ to determine an adjusted colorimetric data value $Lab_2$ which when converted by the inverse form of the transform at step 30 will generate the calibrated printer-dependent data value $CMYK_2$. The value $CMYK_2$ provides a more accurate representation of $Lab_0$.

The foregoing steps can be implemented in software or hardware, where the calculating steps 26, 28 can be accomplished in a conventional accumulating device and, as noted above, the transforms T, $T^{-1}$ can be neural nets.

The subject invention has been tested on two color laser printers. Printer 1 is a color printer with rotated halftone screens in 400×400 dpi and Printer 2 is with line screens also in 400×400 dpi. Neural networks modeled both the forward and the inverse transforms. Two sets of 343 printed color patches sampled differently in CMYK space were used for modeling training and testing, respectively. After both forward and inverse transform models were derived using the given CMYK values and the measured Lab values from the training set, the measured Lab values from the testing set were used for the following comparison. The measured values, $Lab_0$ from each color patch were applied to the feedback procedure, represented by above description and FIG. 1, to obtain device-dependent color signals with and without feedback, $CMYK_1$ and $CMYK_2$. Two new sets of color patches, based on the calculated $CMYK_1$ and $CMYK_2$, respectively, were printed using the same color printer being calibrated and measured in CIE Lab values. The color difference is defined as $\Delta E=\sqrt{\Delta L^2+\Delta a^2+\Delta b^2}$. The average and maximal $\Delta E$s between the original testing set and the new set using $CMYK_1$ provide a measure of accuracy for the printer calibration without feedback, while $\Delta E$s between the original and the set using $CMYK_2$ provide the measure of accuracy for the feedback calibration. The actual results are shown by the following table:

|  | Without Feedback | | With Feedback | |
| --- | --- | --- | --- | --- |
| Printer | Ave. $\Delta E$ | Max. $\Delta E$ | Ave. $\Delta E$ | Max. $\Delta E$ |
| Printer1 | 4.1 | 13.9 | 3.4 | 9.0 |
| Printer2 | 5.1 | 16.0 | 3.5 | 11.1 |

The invention has been described with reference to the preferred embodiments. Obviously, modifications and alterations will occur to others upon the reading and understanding the specification. It is my intention to include all such modifications and alterations insofar as they come within the scope of the appended claims or the equivalents thereof.

Having thus described my invention, I now claim:

1. A method of calibrating a color printer having a transform for converting a first signal of a device-independent color space to a second signal of a device-dependent color space of the printer, comprising steps of:

first, transforming the first signal to a first intermediate signal of the device-dependent color space by an inverse form of the transform;

second, transforming the first intermediate printer signal back to a second device-independent color space signal by a forward form of the transform;

computing a feedback signal comprising a difference between the first signal and the second device-independent color space signal;

adjusting the first signal with the feedback signal to generate an adjusted first signal; and third, transforming the adjusted first signal to the second signal by the inverse form of the transform.

2. The method as defined in claim 1 wherein the transforming the first signal comprises converting a device-independent color signal to a device-dependent color signal and the transforming the first intermediate printer signal comprises converting the device-dependent color signal to a device-independent color signal.

3. The method as defined in claim 1 wherein the adjusting comprises calculating the adjusted first signal by subtracting the difference from the first signal.

4. A method of calibrating a transformation of a first color from a first color space to a second color space, comprising steps of:

transforming the first color from the first color space to a second color of a second color space with a transform;

transforming the second color to a third color of the first color space with an inverse of the transform;

detecting a difference between the first and third colors;

computing a first color, comprising a combination of the first color and the difference; and transforming, by the transform, the fourth color to a fifth color in the second color space whereby the fifth color comprises an improved calibrated transformation of the first color.

5. The method as defined in claim 4 wherein the computing comprises adjusting the first color by the difference.

6. The method as defined in claim 4 wherein the detecting comprises calculating the difference between calorimetric data values representing the first and third colors respectively.

7. A color for printing colorants on a medium, comprising:

means for generating in a first data space, a first colorimetric data signal representative of an item to be printed by the printer;

a processor for transforming the first colorimetric data signal into a first printer colorant signal and for transforming the first printer colorant signal into a second calorimetric data signal in the first data space;

an accumulator for identifying a difference between the first colorimetric data signal and the second calorimetric data signal and for adjusting the first calorimetric data signal by the difference to generate an adjusted colorimetric data signal; and, wherein the processor transforms the adjusted colorimetric data signal into a second printer colorant signal.

8. The color printer as defined in claim 7 wherein the first and second colorimetric data signals comprise CIE XYZ or Lab signals and the first and second printer colorant signals comprise CMY or CMYK signals.

9. The color printer as defined in claim 7 wherein the processor comprises a neural net.

* * * * *